Nov. 29, 1955
C. W. VOGT
2,725,105
ROLL TAPE WITH CUTTER BLADE
Filed Aug. 19, 1952
2 Sheets-Sheet 1
FIG. 1
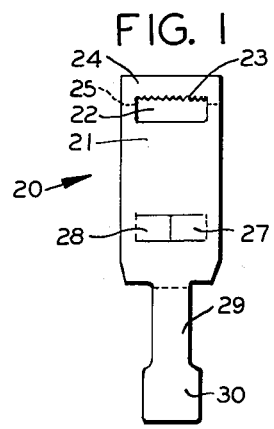
FIG. 2
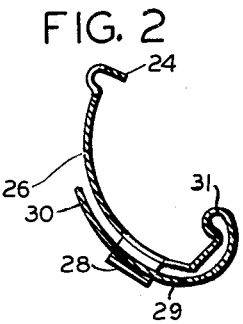
FIG. 3
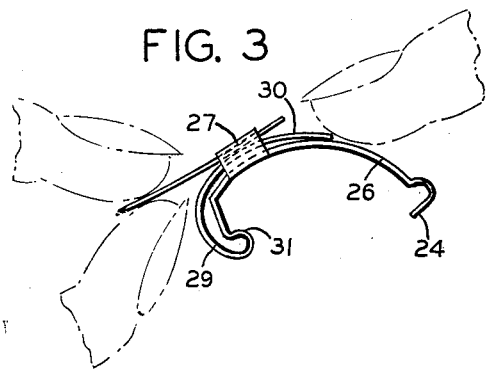
FIG. 4
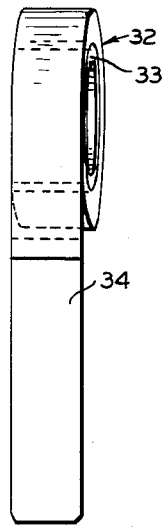
FIG. 5
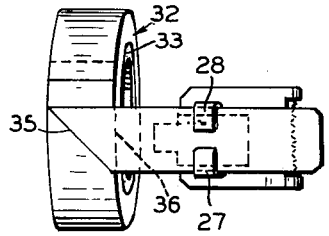
FIG. 6
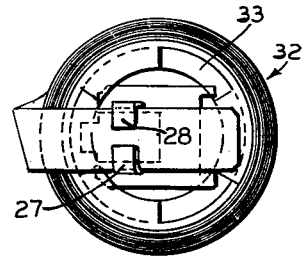
FIG. 7
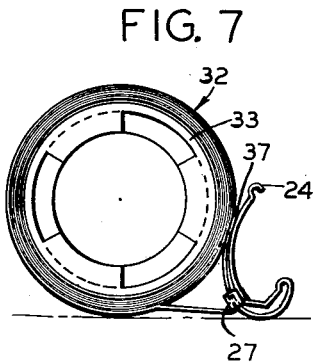
FIG. 9
FIG. 8
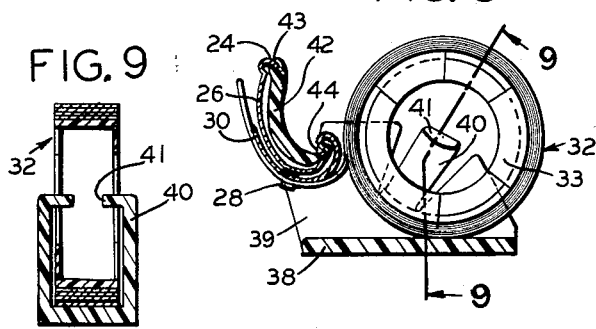
*INVENTOR.*
CLARENCE W. VOGT.
BY
ATTORNEY.

Nov. 29, 1955     C. W. VOGT     2,725,105
ROLL TAPE WITH CUTTER BLADE
Filed Aug. 19, 1952     2 Sheets-Sheet 2
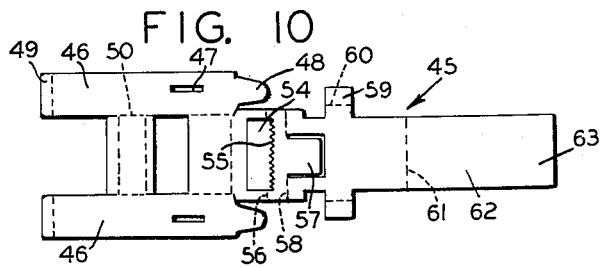
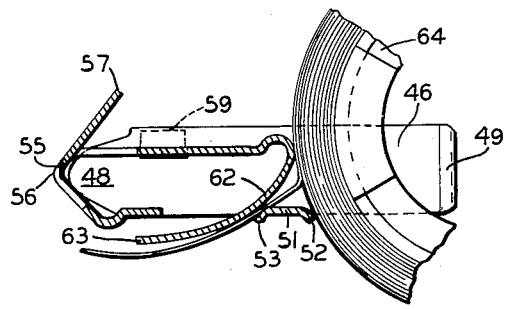
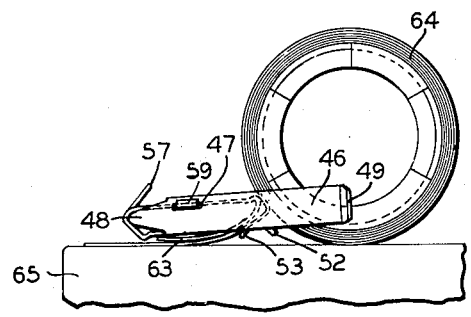
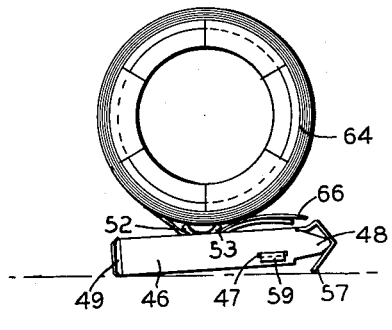
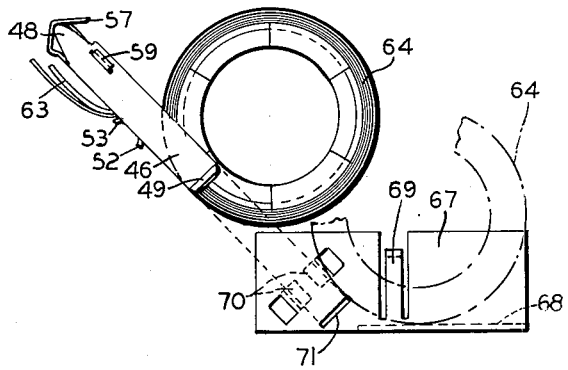
*INVENTOR.*
CLARENCE W. VOGT
BY
ATTORNEY.

United States Patent Office 2,725,105
Patented Nov. 29, 1955

2,725,105

ROLL TAPE WITH CUTTER BLADE

Clarence W. Vogt, Norwalk, Conn.

Application August 19, 1952, Serial No. 305,229

8 Claims. (Cl. 164—84.5)

The present invention relates to adhesive tapes and, more particularly, to rolls of such tapes having secured to the outer ends thereof a cutting member for use in dispenser mechanisms.

Numerous forms of tape dispensers have been provided for dispensing tapes in roll form, such mechanisms usually being provided with a knife edge or cutting element by means of which the tape is severed after a desired quantity thereof has been removed from the roll. More recently, and in improved designs, such for example, as illustrated in my co-pending application for United States Letters Patent Serial No. 297,459 filed July 7, 1952, it has been suggested to provide a structure wherein the cutting element is replaceable, and it is an object of this invention to provide tape in roll form with such a cutting element in order that, as rolls are replaced in the dispensing mechanism, the cutting element may be conveniently and effectively replaced thereby to insure the effective operation of the dispensing mechanism.

Yet another object of this invention is to provide, as an article of manufacture, tape in roll form with a cutting element secured to the outer end of the tape in such fashion that it is positioned for effective insertion into the dispensing mechanism.

A further object of this invention is to provide, as an article of manufacture, an improved tape cutting and applying member formed in such fashion as to be secured to a roll of tape merely by gripping an exposed end of the roll.

Another object of the invention is to provide, as an article of manufacture, tape in roll form with a cutting element secured to the outer end of the tape by components on the element which grip the end of the tape.

Yet another object of this invention is to provide, as an article of manufacture, tape in roll form with a cutting element secured to the outer end of the tape and nested within the core of the tape roll.

Other and further objects of this invention will be apparent as it is described in connection with the accompanying drawings, wherein Figure 1 is a plan view of a blank formed in accordance with this invention and from which a tape cutting and applying member may be formed;

Figure 2 is a view in transverse section showing the blank of Figure 1 after it has been formed into a cutting and applying member in accordance with this invention;

Figure 3 is a view in side elevation showing the member of Figure 2 and illustrating the manner in which tape material may be inserted into the device;

Figure 4 is a view partly in plan and partly in perspective showing a roll of tape provided with an extension to which the cutting element may be applied in accordance with this invention;

Figure 5 is a view similar to Figure 4 showing the manner in which the cutting element is applied to the extension;

Figure 6 is a view in side elevation showing the manner in which the cutting element is nested within the core of the tape roll;

Figure 7 is a view similar to Figure 6 showing a modified way in which the cutting element may be attached to the tape roll;

Figure 8 is a view in longitudinal section showing the manner in which the tape and cutter may be applied to a holding mechanism;

Figure 9 is a view in transverse section, taken on the broken line 9—9 of Figure 8 and looking in the direction of the arrows;

Figure 10 is a view similar to Figure 1, showing a modified form of the invention;

Figure 11 is a view in partial longitudinal section showing the tape cutter formed from the blank of Figure 10;

Figure 12 is a view in side elevation illustrating the manner in which the device of Figure 11 may be used to apply the tape to a desired surface;

Figure 13 is a view in side elevation showing the manner in which the cutter and tape roll may repose during periods of non-use;

Figure 14 is a view in side elevation showing the manner in which the article of Figure 12 may be applied to a holder.

Referring to the above drawings, and particularly to Figures 1 to 9 inclusive, a blank, preferably of metal, is shown at 20 as being formed of a body portion 21 having an aperture 22 formed therein, one edge of the aperture 23 being provided in serrated form in order that a suitable tape cutting edge will result. The outer end 24 of the blank is adapted to be folded back, as illustrated in Figure 2, the fold beginning at the dot and dash line indicated at 25 in Figure 1 and continuing as shown in Figure 2. The body portion 21 of the blank is bowed convexly to provide a pressure surface 26 which may be used to apply the tape against the desired surface aided by tongue 30.

At the lower end of the body 21, ears 27 and 28 are formed, these ears being bent outwardly away from the plane of the body 21 and then inwardly as illustrated in Figures 5 and 6. The lower end of the blank is formed as a flexible spring element 29 having a tongue extension 30 formed on the outer end thereof. The spring element 29 serves as a pressure or snubbing member as illustrated in Figures 2 and 3, being bent reversely and extending between the tabs or ears 27 and 28. As illustrated in Figures 2 and 3, the snubber 29 is formed so that normally it presses against the ears 27 and 28, the lower extremity of the snubber being formed as a yielding nose 31 to facilitate the application of the cutter to a holder as illustrated in Figure 8.

In using the cutting mechanism of Figures 1, 2 and 3, a roll of tape indicated at 32 and preferably provided with a core 33, has applied to the outer end thereof an extension 34. This extension preferably has no adhesive material on either surface and may be provided with suitable printing if desired. The extension is formed with a fold 35 that brings the end thereof outwardly at right angles to the plane of the roll 32 as illustrated in Figure 5. The extension is then inserted between the ears 27, 28 and the snubber 29, as illustrated in Figure 3, the location of the cutter with respect to the extension being such that, when the extension is again folded along the dotted line 36, the cutter is positioned directly over the hollow portion of the core 33 (Figure 6). The cutter is preferably of such dimensions that it is received within the core, as illustrated in Figure 6, thus providing a convenient article of commerce.

If desired, the cutter may be applied to the end of the tape without utilizing the extension 34. In Figure 7, for example, the end of the tape is removed from the roll and inserted into the cutter as illustrated in Figure 3 with the tacky side of the tape against the ears and away from the snubber. The extreme end 37 is then adhered to the outer convolution of the roll of tape and the roll and cutter thus becomes an article of manufacture capable of resting as illustrated in Figure 7 in such fashion that the tacky portions of the tape do not become exposed.

In Figure 8 there is shown a holding mechanism to which the article shown in Figures 1 to 7 inclusive may be applied. The holder consists of a base member 38 and opposite side plates 39 upon which yielding extensions 40 may be formed. The ends of the extensions preferably are formed with inwardly extending flanges 41 in order that the roll of tape may be removably secured in the position illustrated in Figures 8 and 9.

Between the side plates 39 a curved bridge member 42 is provided, this bridge member being formed with a slot 43 within which the edge 24 is received, the lower extremity 44 of the bridge member being adapted to have the nose 31 snap thereover. The holder and tape are then used by grasping side plates between the thumb and second finger utilizing the bridge 42 as a rest for the forefinger. The tape roll and holder are received, of course, within the palm of the hand. It will be apparent that the holder may be formed of plastic material or of any other suitable substance.

In the form of the invention illustrated in Figures 10 to 14 inclusive, the invention is shown as embodied in a cutting and applying member formed from a blank 45. This blank has spaced side plates 46 within which apertures 47 are formed and at the right hand extremities of which reinforcing extensions 48 are formed. The left hand extremities of the plates 46 may, if desired, be bent outwardly as indicated at 49, the blank being bent along the dotted lines indicated at 50 in order that the side plates may be formed into their assembled positions.

The material of the blank is formed with a bar or bridge 51 between the side plates 46, the edges 52 and 53 of which are adapted to be bent outwardly as illustrated in Figure 11. The blank is also formed with an aperture 54 one side of which is serrated at 55 to provide a cutting edge, the material of the blank being bent at the dotted line indicated at 56 into the form illustrated in Figure 11. In so bending the blank, the outer edges forming the aperture 54 are folded against the edges of the reinforcing extensions 48 thus to strengthen and reinforce the cutting mechanism. As will be seen in Figure 11, the edge 55 of the cutting element lies below the plane of the nose 56 to protect the surface upon which the tape is applied from scuffing or marring by the cutting edge.

Continuing with the formation of the article from the blank of Figure 10, a finger tab 57 is formed out of the material of the blank and is adapted to extend and lie in the position illustrated in Figure 11, the blank being folded along the dotted line 58 as illustrated in Figure 11.

Upon opposite sides of the blank outwardly extending ears 59 are formed, these ears being received within the apertures 47 and upset along the dotted lines 60, as illustrated in Figures 12, 13 and 14. The remaining portion of the blank then is bent at the line 61 to form the yielding presure member or snubber 62 which normally lies against the bar 51 and adjacent the turned down edge 53 thereof. The outer extremity 63 serves as a tongue which, as illustrated in Figure 3, may be pressed inwardly by the finger in order to release the snubber from engagement with the tape and to facilitate the insertion or withdrawal of the tape from the device.

As illustrated in Figure 12, a roll of tape 64 may be applied to the cutter in the manner hereinabove described and this end applied to the surface of an object 65, the forefinger resting against the tab 57 and the thumb and second finger engaging the side plates 46. The yielding tongue 63 thus serves as a yielding pressure member to facilitate the securing of the adhesive material to the surface of the article 65. When not in use, the article may repose in the manner illustrated in Figure 13 during which time the roll of tape rests upon the edges of the portions 52 and 53 of the bar 51. As illustrated in Figure 13, the upper surface of the extreme end 66 of the tape has adhesive material thereon but, since it lies within the line drawn tangent to the outer surface of the roll of tape and the outer extremity of the right hand portion of the cutter member as shown in Figure 13, it will not be exposed to contact surfaces accidentally.

If desired, the tape and cutter element may be applied to a holder which is shown generally at 67, this holder being formed of spaced side plates with a bottom plate indicated by the dotted line at 68 and within which the roll of tape may be received. Arms 69 may serve to hold the tape roll yieldingly within the holder and oppositely extending ears 70 may be pressed out of the side plates 67 to receive the adjacent extremities of the side plates 46 as illustrated by the dotted lines applied to Figure 14. Slots 71 may also be formed in the side plates 67 to receive the outwardly bent portions 49 of the side plates 46.

From the foregoing it will be apparent that there has been provided a device which may be secured to the end of a roll of tape and which grips the end of the tape positively in order that it may be retained thereon. The adhesive character of the tape may include pressure sensitive, heat sensitive or other forms of adhesive. The mechanism furthermore provides elements which effectively serve to apply the tape to the desired surface and to facilitate the cutting of the tape after a desired length thereof has been applied to a surface. The structure is simple and readily manufactured by extremely simple manufacturing operations and is easily utilized not only in the simple form illustrated, but with numerous forms and holders that may be designed to provide varied uses. The snubbing structure serves effectively to prevent the accidental escape of the end of the tape roll from the applying and cutting mechanism and, as above stated, is additionally formed so as to facilitate manual manipulation to accomplish the removal and reinsertion of tape into the mechanism.

While the invention has been described with reference to the accompanying drawings, it is not to be limited save as defined in the appended claims.

I claim:

1. As an article of manufacture a cutting element adapted to cut adhesive tape material and comprising a body member having spaced ends adjacent one of which a cutting edge is formed, means on the body member forming a snubbing surface spaced from the body member, and yielding means on the body member lying in the space between the snubbing surface and body member and normally urged against the snubbing surface and adapted to engage tape material inserted between the yielding means and the snubbing surface.

2. A device according to claim 1 wherein the means forming a snubbing surface comprises spaced ears.

3. A device according to claim 1 wherein the means forming a snubbing surface comprises a snubbing bar.

4. As an article of manufacture a cutting element adapted to cut adhesive tape material and comprising a body member having spaced ends adjacent one of which a cutting edge is formed, means on the body member forming a snubbing surface, and yielding means on the body member normally urged against the snubbing surface and adapted to engage tape material inserted between the yielding means and the snubbing surface, said yielding means being formed with a tape applying pressure surface comprising an extension over the outer surface of which the tape material is adapted to move.

5. A device according to claim 1 wherein the body member is convexly curved between the cutting edge and the snubbing surface and wherein the yielding member is convexly curved.

6. A device according to claim 1 wherein the body member is formed with spaced side plates between which the yielding member lies.

7. A device according to claim 1 wherein the body member is formed with spaced side plates between which the yielding member lies, and a finger tab between the side plates and adjacent the cutting edge.

8. A device according to claim 1 wherein the body member is formed with spaced side plates between which the yielding member lies, and a finger tab between the side plates and adjacent the cutting edge, and extensions on the side plates underlying the body member adjacent the cutting edge to reinforce the same.

References Cited in the file of this patent
UNITED STATES PATENTS

| | | |
|---|---|---|
| 2,144,883 | Kind | Jan. 24, 1939 |
| 2,423,004 | Butler | June 24, 1947 |
| 2,511,927 | MacIntyre | June 20, 1950 |
| 2,528,958 | Johnson | Nov. 7, 1950 |
| 2,578,519 | Double | Dec. 11, 1951 |
| 2,609,877 | Hannington | Sept. 9, 1952 |